Patented July 19, 1932

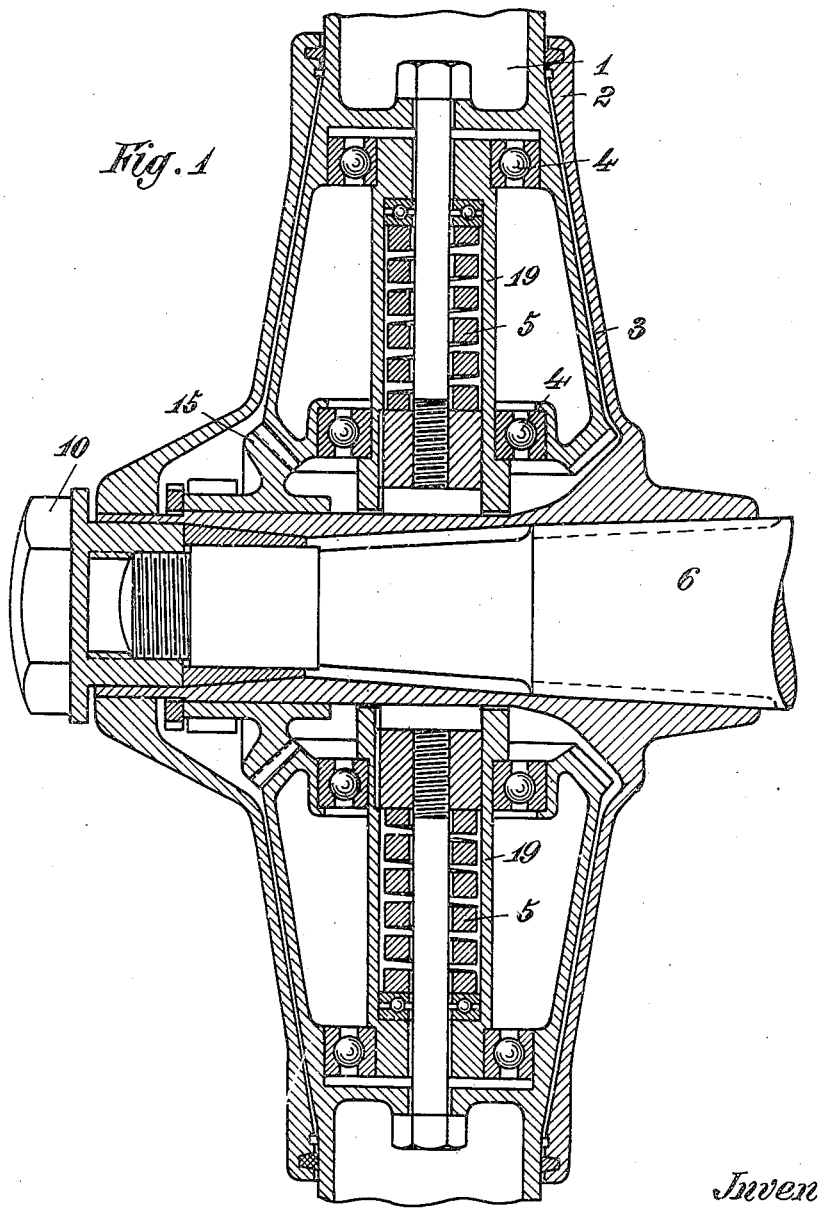

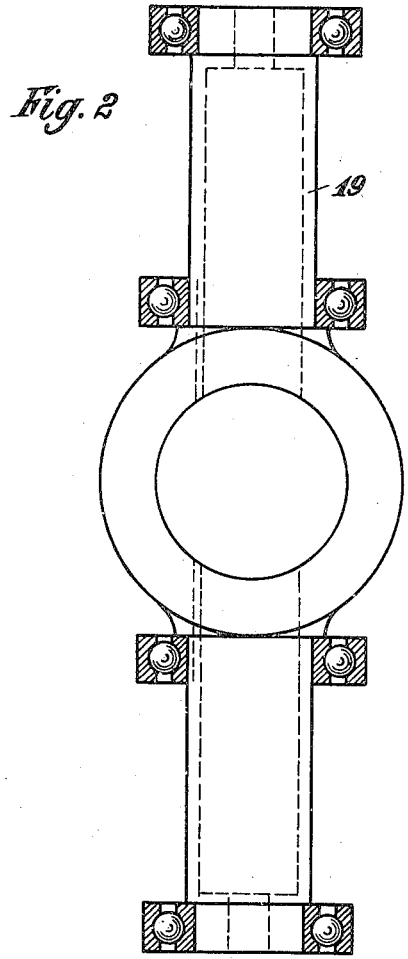

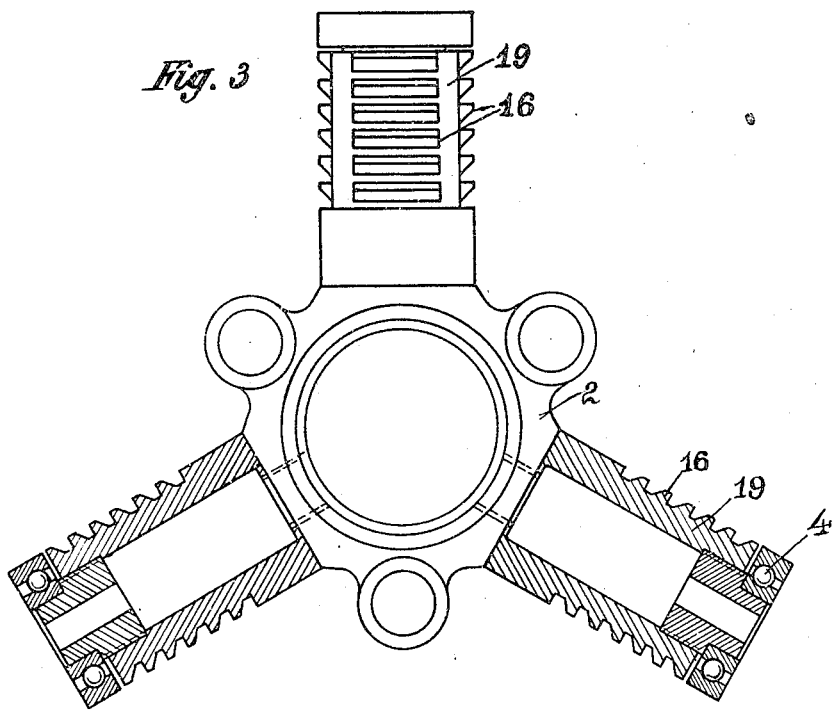

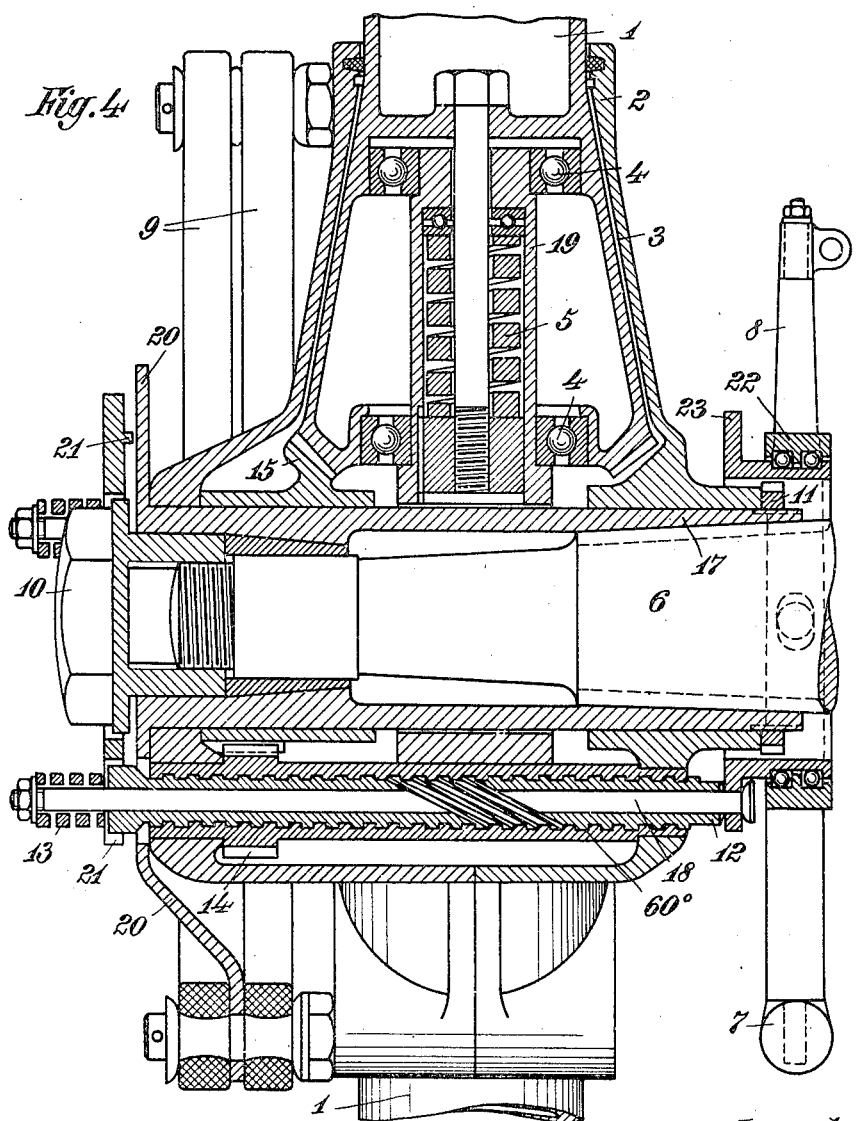

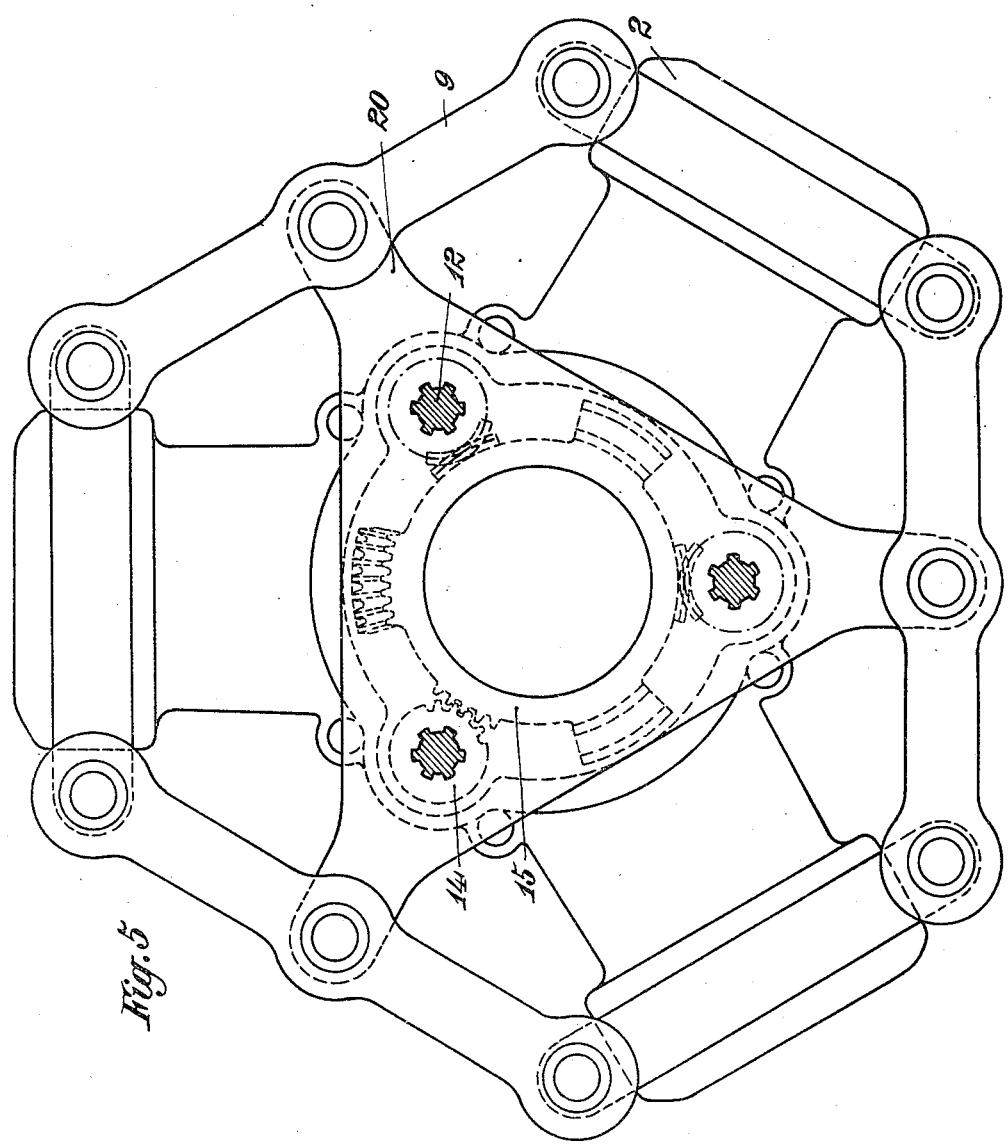

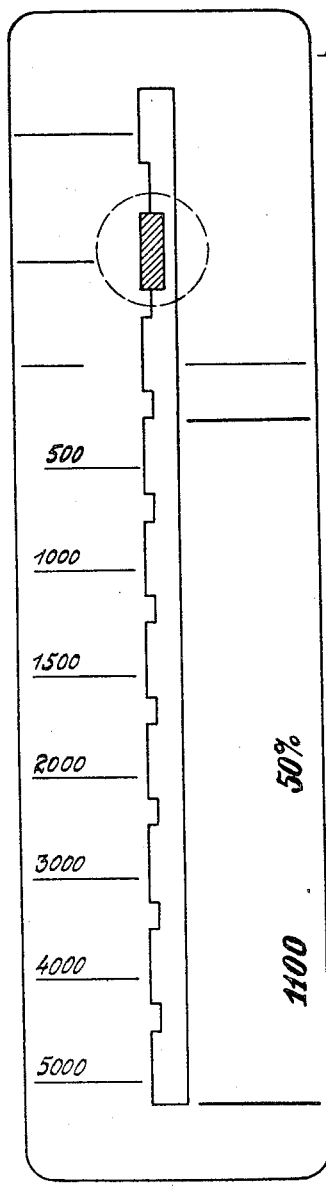
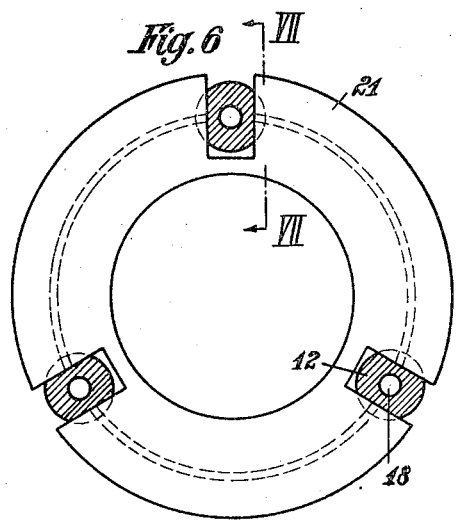
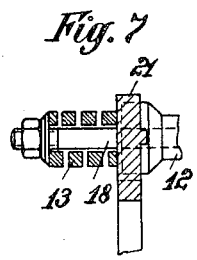

1,867,715

UNITED STATES PATENT OFFICE

ARNOLD SEIDEL, OF BERLIN-CHARLOTTENBURG, GERMANY

AIR PROPELLER WITH ANGLE OF PITCH CHANGEABLE IN FLIGHT

Application filed February 27, 1930, Serial No. 431,794, and in Germany March 1, 1929.

This invention relates to an air propeller with angle of pitch changeable in flight, in which in the idle running range the centrifugal forces are taken up by springs, and it consists firstly in that two bearings for the propeller blades independent the one from the other are provided, namely a movable bearing for the adjusting- and idle running range of the propeller and a rigid, preferably conical bearing for the efficient range of the propeller, the movable bearing of the propeller blades being provided on a common inner journal piece and the rigid bearing in the divided boss casing; the counter pressure spring for the slight centrifugal forces of the idle running speed bears on an accordingly weak thrust ball bearing, which is no more stressed at any revolving speed. The blades in the particular construction are mounted by means of a bayonet joint on the undivided journal of the boss, and a rigid bearing is provided on each journal in conical fitting surfaces and a movable bearing, partly on ball bearings.

It is already known to relieve centrifugal forces by an intermediate sleeve merely the ball bearings of the propeller blades in the boss above a certain rotating range and to take up the slight centrifugal forces in the lower rotating range with the aid of a counter-pressure spring directly through the carrying ball bearing in the interest of easy adjustability of the propeller blades.

According to the invention in two different forms of construction two bearings are provided for the propeller blades completely independent the one of the other, namely an absolutely rigid bearing free from play in conical fitting surfaces above the idle running- and adjusting range, owing to the extraordinarily great centrifugal forces. Owing to this rigid seating the second, movable bearing provided for the adjusting range is relieved of all forces. This effect is of considerable practical importance. It has been found in practice, that the slightest play in the boss leads to dangerous vibrations and causes seizing of the bearing points, which cannot be prevented by any means. Apart from the centrifugal forces the intermittent explosion pressures are very serious. Hitherto these explosion stresses had to be taken up by the ball bearings. A further precarious point is that, apart from the play of the ball bearings, the outer ring of the outer ball bearing and the inner ring of the inner ball bearing must be also easily movable in axial direction as otherwise the spring tension is not sufficient and at high spring tension the intended relieving of the ball bearings is not obtained.

According to the application, the arrangement differs in the efficient range of the propeller in no way from a normal rigid bearing, and the second movable bearing, which in the idle running range is only rendered inoperative by the extension or compression of the radially acting spring, is always absolutely reliable in service. A wrong manipulation of the adjusting device on the part of the pilot is practically inconceivable as, when flying at about 500 revolutions, the efficiency of the propeller is practically equal to zero, and at slight increase of the speed amounting to about 50 revolutions, for which the spring tension is not calculated, the adjusting device immediately blocks the cone effect and relieves the movable bearing.

The invention relates further to air propellers, the pitch of which can be altered during flight by an operating bevel wheel or the like, situated concentric to the shaft, with which wheel the individual propeller blades mesh. Hitherto the relative rotation of the concentric bevel wheel to the shaft was produced by displacement axially to the shaft of a screw locked in the direction of rotation, which was screwed with a comparatively steep thread into the concentric operating bevel wheel. The known constructions are practically unusable, as the dangerous propeller oscillations act with considerable lever moment on these multiple movable bearings and in spite of hardened and ground fitting surfaces cause seizing of the adjusting device.

Contrary to the actuation of the concentric bevel wheel by axial displacement of a spindle, concentric to the propeller shaft, the operation of the concentric bevel wheel is effected according to the invention by a set of eccentric spindles arranged parallel to the propeller shaft and axially displaceable in common. These spindles, which in the example shown are three in number, project from the boss of the propeller at the front and at the rear. The three spindles are connected on the rear side of the boss by a disc provided with a groove for a cardan-like suspended slide ring. The axial displacement of the spindles is effected by the slide ring through a hand-operated rod mechanism. On the front side of the boss the spindles are connected by a second disc and individually locked against rotation in this disc by square headed bolts in slots in the disc. The spindles are not screwed in both discs, in the front and in the rear disc, at right angles and tightly, but are adjustable by means of spherical construction of the bearing ends or by inserted springs for the purpose of distributing the operating pressure, also in the case of inaccuracies in manufacture, uniformly on all three spindles and thereby preventing jamming of the spindles.

The eccentric spindles are screwed into sleeves, which are mounted rotatable, but not axially displaceable, in the boss and engage each by a tooth segment in a spur wheel segment of the concentric bevel wheel.

The following are the characteristic advantages of the invention with regard to the adjusting means.

1.—The mounting of the propeller on the propeller shaft is effected independently of the adjusting device. Consequently the propeller can be fastened rigidly on the shaft without the slightest play. The propeller oscillations can therefore under no circumstances cause a stressing and seizing of the bearing of the adjusting device.

2.—The use of elastic transmission means for taking up the explosion pressures is possible without affecting or loading the adjusting device. With axially displaceable, concentric actuating spindles an elastic turning of the propeller on the shaft would at the same time produce an alteration in the blade pitch.

3.—The friction resistances of the spindles, which have to be overcome when actuating the adjusting device, are very low with the eccentric spindles, because the spindle diameters are very small and the forces of the propeller oscillations which cannot be calculated never act thereon. The concentric actuating spindle seizes almost completely, as the propeller is mounted thereon, and it has, owing to the continuous propeller shaft, a much too large diameter for perfect working.

4.—According to the application the spindle friction is the only determining factor for the spindle operation, whereas in the case of concentric actuating spindles the friction of the key grooves, designed to hold the spindle in the direction of rotation, must be added with at least the same theoretical friction value to the spindle friction. The connecting disc of the three eccentric spindles, securing against rotation, does not cause additional friction as it turns therewith.

The adjustment of the propeller is effected in the idle running range of the propeller at about 500 revolutions in flight. Owing to the fact that, for the individual propeller blades, two bearings are provided independent the one of the other, namely a bearing on a common inner trunnion by means of ball bearings and thrust bearings and a stationary conical bearing in the hub housing proper, and to the fact that the inner movable bearing is relieved from all detrimental forces in the efficient range of the propeller, the turning of the propeller blades proper offers practically no frictional resistances. The frictional resistances remain limited moreover almost exclusively to the spindle friction of the three eccentric spindles, which exactly in the same way as the movable bearings of the propeller blades are always relieved of the detrimental forces and propeller oscillations. Owing to the particularly easy operation of the adjusting device springs can be built into the operating rod mechanism, which enable the pilot, for example prior to carrying out an emergency landing, to previously set the desired propeller pitch at higher rotation speed of the propeller, for example at 800 revolutions. Consequently a spring pressure is merely exerted on the adjusting device, without however a displacement of the screw blades being possible, as the clamping effect in the boss funnel at speeds higher than 500 revolutions blocks the entire arrangement. The pilot can therefore set this lever to braking position before effecting an emergency landing, without however a reversal of the propeller taking place at 800 revolutions. If at the last minute the place for the emergency landing appears unsuitable to the pilot, he again gives full charge to the engine. If on the other hand the place appeared favorable but the run too short, as is generally the case, he pulls back quickly the gas lever, which he has in any case in his hand, immediately the aeroplane touches the earth, and he then immediately gives full charge. This instant of cutting off the gas is amply sufficient for the automatically reversing of the propeller to braking effect. The centrifugal forces below 500 revolutions are namely taken up by the radial pressure springs and consequently the rigid conical bearings are disengaged and the movable bearings engaged. The disengagement amounts in itself only to a fraction of a millimeter.

A further feature of the arrangement according to the invention is the insusceptibility of the adjusting mechanism through the relative distortion of the propeller hub relative to the shaft when higher explosion pressures are taken up elastically for example by tangentially acting rubber bands in the case of Diesel-engines.

Several embodiments of the invention are illustrated by way of example in the accompanying drawings in which:

Fig. 1 shows a two blade propeller in longitudinal section.

Fig. 2 shows the inner trunnion part with ball bearings of a two blade propeller, also in section.

Fig. 3 is a section through an inner trunnion part for a three blade propeller.

Fig. 4 shows the hub of a three-blade propeller partly in section, showing besides the propeller bearing the adjusting means proper of the adjustable propeller.

Fig. 5 is a top plan view of a hub with elastic transmission of the explosion shocks with tangentially acting rubber connecting pieces, the steep adjusting spindles being shown in section. The broken lines show a concentric rotatable part with three bevel wheel segments for turning each individual propeller blade and with three spur wheel segments for engaging the screw threaded sleeves, rigidly mounted axially to the propeller shaft but rotated by axial displacement of the non rotatable spindles.

Fig. 6 is a top plan view, partly in section of the connecting disc, freely adjustable at an angle, of the three adjusting spindles secured against rotation in the disc by flattened heads.

Fig. 7 is a section on line 7—7 of Fig. 6 and shows that the disc is not rigidly connected in the angle with the spindles, but, owing to the cardan arranged operating slide ring of the spindles, arranged on the rear side of the hub, can be adjusted freely at an angle in the same manner. This arrangement is intended for effecting a uniform loading of all spindles.

Fig. 8 shows diagrammatically an adjusting scale for the operating lever near the driver's seat. The operating lever can, owing to the interposed springs, be engaged also at full output in any desired rest.

In Fig. 1 the propeller hub 2 divided in vertical plane is held with the conical main bearings 3 for the propeller blades 1 by the fastening nut 10 on the crank shaft end 6, the blades 1 being actuated by a concentric bevel wheel 15. In Fig. 1 the conical bearing is shown in loosened position and the running bearing composed of balls 4 on the inner loose stud 19 is effective in the adjusting range of the propeller of about 500 revolutions. The centrifugal forces of this speed are taken up by the pressure spring 5, which bears on a thrust bearing.

The difference between the construction shown in Fig. 1 and that shown in Fig. 3 consists in that in the latter all forces of the inner hub 19 are continually (that is at all speeds of rotation) taken up by the three armed stud by the conical counter bearing 16, in order to completely relieve a hub casing, composed of light metal. In order to avoid screw connections, the conical counter bearings 16 are made for example as bayonet joints.

As the centrifugal forces increase in ratio equal to the square of the speed, the cone clamping effect is so perfect, that, when springs are used in the actuating rod mechanism for the pilot, the hand adjustment to reverse can be effected already before the landing, it being impossible to reverse the propeller maintained at about 800 revolutions. The pilot, as has already been said, is therefore in a position, in the event of emergency landings not caused by engine defects, to give full gas forward by operating the gas lever or to automatically reverse the propeller and to give full gas for reverse by abruptly pulling back the gas lever.

In Fig. 4 the bush 17 is held on the crank shaft 6 and the propeller hub 2 with the propeller blades 1 rotatable on the bush 17 by the operating nut 10. By means of the triangular catch disc 20 of the bush 17 the turning moment is elastically transmitted through three pairs of rubber straps 9 to the circumference of the propeller hub 2 (Figs. 4 and 5). The operating bevel wheel 15 is loosely rotatable on the bush 17 with which wheel the individual propeller blades 1 mesh and which wheel is driven through the three pinions 14 of the adjusting spindles 12 (Figs. 4 and 5). The three spindles are connected together through the discs 21 and 23 by means of screw bolts 18 and pressure springs 13 and are freely adjustable in angle, in order to prevent a jamming of the adjusting device. For the same reason the operating rod 8, which carries the slide ring 22, is rotatable around the horizontal axis and mounted directly rotatable on its vertical axis in the shaft 7. In known manner, besides the conical main bearings of the propeller studs, a second bearing is provided by means of ball- and thrust-bearings on an inner stud 19 for the adjusting range of about 500 revolutions per minute. At this running speed the conical main bearings of the propeller trunnion 1 are released by the relieving spring 5.

Figs. 6 and 7 show the bearing of the rectangular heads of the adjusting spindles 12 in the slots of the disc 21 and the connecting bolts 18, which hold together the catch discs 23 (Fig. 4) and 21 by means of the pressure springs 13.

Fig. 8 shows the scale of the adjusting device, which can be already previously adjusted to the subsequently required degree of pitch of the propeller blades by means of springs built in the rod mechanism. The adjustment proper then takes place subsequently automatically by a single short shutting off of the gas.

I claim:

1. An air propeller with pitch angle adjustable in flight, comprising in combination a system of eccentric spindles of high pitch, a concentric catch disc locking said spindles individually against rotation, a hub of said propeller, a number of pinions corresponding to the number of spindles eccentrically mounted in said hub, adapted to be actuated by the axial displacement of said spindles in relation to said hub, and a main concentric operating wheel of the individual propeller blades, engaging commonly with each of said pinions.

2. An air propeller, comprising in combination hollow spindles, bolts in said hollow spindles, a catch disc resiliently supporting said bolts in both opposite directions, a hub for the propeller blades, a number of pinions on said hub, said bolts serving for ensuring a uniform drive of said pinions by said spindles and preventing jamming.

3. An air propeller, comprising in combination a slide ring oscillatable around a vertical and horizontal axis, three eccentric spindles supporting said slide ring, a separate freely adjustable disc adapted to actuate said spindles, a second disc freely adjustable on the opposite side of the hub adapted to lock said spindles merely against rotation, screw bolts, and an interpositioned pressure spring connecting said two last mentioned discs adapted to distribute the pressure in both axial operating directions absolutely uniformly to the spindle system.

4. An air propeller with pitch angle adjustable in flight, comprising in combination a double hub for the propeller, an outer hub casing, a stationary bearing in said casing for the loading range of the propeller, a floating trunnion forming the inner hub, and a movable ball bearing for the idle running range of the propeller on said trunnion said hub bearings adapted to alternately become operative so that said inner hub with said ball bearing being relieved of all forces in the loading range, namely the centrifugal forces the thrust and tension moment of the propeller and the torque and the bending and leverage stresses resulting from these last two forces.

In testimony whereof I affix my signature.

ARNOLD SEIDEL.